(12) United States Patent
Oikarinen et al.

(10) Patent No.: US 9,235,221 B2
(45) Date of Patent: Jan. 12, 2016

(54) EARLY WARNING STROBE FOR MITIGATION OF LINE AND LOAD TRANSIENTS

(71) Applicants: Juha Joonas Oikarinen, Santa Clara, CA (US); Juha-Matti Kujala, Kokkola (FI); Jonathan Klein, Palo Alto, CA (US)

(72) Inventors: Juha Joonas Oikarinen, Santa Clara, CA (US); Juha-Matti Kujala, Kokkola (FI); Jonathan Klein, Palo Alto, CA (US)

(73) Assignee: FAIRCHILD SEMICONDUCTOR CORPORATION, San Jose, CA (US)

( * ) Notice: Subject to any disclaimer, the term of this patent is extended or adjusted under 35 U.S.C. 154(b) by 314 days.

(21) Appl. No.: 13/826,679

(22) Filed: Mar. 14, 2013

(65) Prior Publication Data

US 2013/0249438 A1   Sep. 26, 2013

Related U.S. Application Data

(60) Provisional application No. 61/614,726, filed on Mar. 23, 2012.

(51) Int. Cl.
| | |
|---|---|
| *H05B 41/28* | (2006.01) |
| *G05F 1/10* | (2006.01) |
| *H05B 37/02* | (2006.01) |
| *H05B 33/08* | (2006.01) |
| *H02M 3/158* | (2006.01) |
| *H02M 1/00* | (2007.01) |
| *H02M 3/156* | (2006.01) |

(52) U.S. Cl.
CPC .................. *G05F 1/10* (2013.01); *H02M 3/158* (2013.01); *H05B 33/0815* (2013.01); *H05B 37/02* (2013.01); *H02M 2001/0032* (2013.01); *H02M 2003/1566* (2013.01); *Y02B 70/16* (2013.01)

(58) Field of Classification Search
USPC ................................... 315/246–287
See application file for complete search history.

(56) References Cited

U.S. PATENT DOCUMENTS

| | | | | |
|---|---|---|---|---|
| 7,109,668 | B2 * | 9/2006 | Pogodayev et al. | 315/307 |
| 2009/0174340 | A1 * | 7/2009 | Kumagai | 315/291 |
| 2011/0080118 | A1 * | 4/2011 | Daniel | 315/297 |
| 2011/0279060 | A1 * | 11/2011 | Wang | 315/297 |
| 2012/0286691 | A1 * | 11/2012 | Jesme | 315/250 |

(Continued)

FOREIGN PATENT DOCUMENTS

| | | |
|---|---|---|
| CN | 101071981 A | 11/2007 |
| CN | 103326565 A | 9/2013 |

(Continued)

OTHER PUBLICATIONS

"Chinese Application Serial No. 201310098245.8, Office Action mailed Jan. 26, 2015", with English translation of claims, 8 pgs.
"Chinese Application Serial No. 201310098245.8, Voluntary Amendment filed Jan. 8, 2014", with English translation of claims, 30 pgs.

(Continued)

*Primary Examiner* — Brandon S Cole
(74) *Attorney, Agent, or Firm* — Schwegman Lundberg & Woessner, P.A.

(57) ABSTRACT

This document discusses apparatus and methods associated with an early warning strobe input of a boost converter. In an example, a method of increasing a set point of a boost converter configured to provide power to a mobile device can include receiving an indication that the mobile device will transition from the first low-power mode to a second higher-power mode; and increasing the set point of the boost converter in response to the indication.

22 Claims, 3 Drawing Sheets

(56) References Cited

U.S. PATENT DOCUMENTS

| | | | |
|---|---|---|---|
| 2013/0002165 A1* | 1/2013 | Rouvala et al. | 315/294 |
| 2013/0200815 A1* | 8/2013 | Schie | 315/224 |
| 2014/0139499 A1* | 5/2014 | Hussain et al. | 345/204 |
| 2014/0145618 A1* | 5/2014 | Goscha et al. | 315/85 |

FOREIGN PATENT DOCUMENTS

| | | |
|---|---|---|
| JP | 2005130616 A | 5/2005 |
| JP | 2009171837 A | 7/2009 |
| JP | 2010246294 A | 10/2010 |
| JP | 4871970 B2 | 11/2011 |
| KR | 101315929 B1 | 10/2013 |
| KR | 1020130108203 A | 10/2013 |

OTHER PUBLICATIONS

"Chinese Application Serial No. 201320138358.1, Office Action mailed Jun. 28, 2013", with English translation, 2 pgs.

"Chinese Application Serial No. 201320138358.1, Response filed Aug. 13, 2013", with English translation of claims, 22 pgs.

"Korean Application Serial No. 10-2013-0031460, Response filed Jul. 11, 2013", with English translation of claims, 20 pgs.

"Korean Application Serial No. 10-2013-0031460, Notice of Allowance mailed Jul. 16, 2013", with English translation, 6 pgs.

"Korean Application Serial No. 10-2013-0031460, Office Action mailed Apr. 12, 2013", with English translation of claims, 8 pgs.

Sim, Sang Bo, et al., "The Remote Control of Flyback Converter using TMS320F2812", with English abstract, (2004), 690-692.

* cited by examiner

EARLY WARNING STROBE FOR MITIGATION OF LINE AND LOAD TRANSIENTS

CLAIM OF PRIORITY

This application claims the benefit of priority under 35 U.S.C. 119(e) to Oikarinen et al., U.S. Provisional Patent Application Ser. No. 61/614,726, entitled, "EARLY WARNING STROBE FOR MITIGATION OF LINE AND LOAD TRANSIENTS," filed Mar. 23, 2012, hereby incorporated by reference herein in its entirety.

OVERVIEW

This document discusses apparatus and methods associated with an early warning strobe input of a boost converter. In an example, a method of increasing a set point of a boost converter configured to provide power to a mobile device can include receiving an indication that the mobile device will transition from the first low-power mode to a second higher-power mode; and increasing the set point of the boost converter in response to the indication.

This overview is intended to provide a general overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
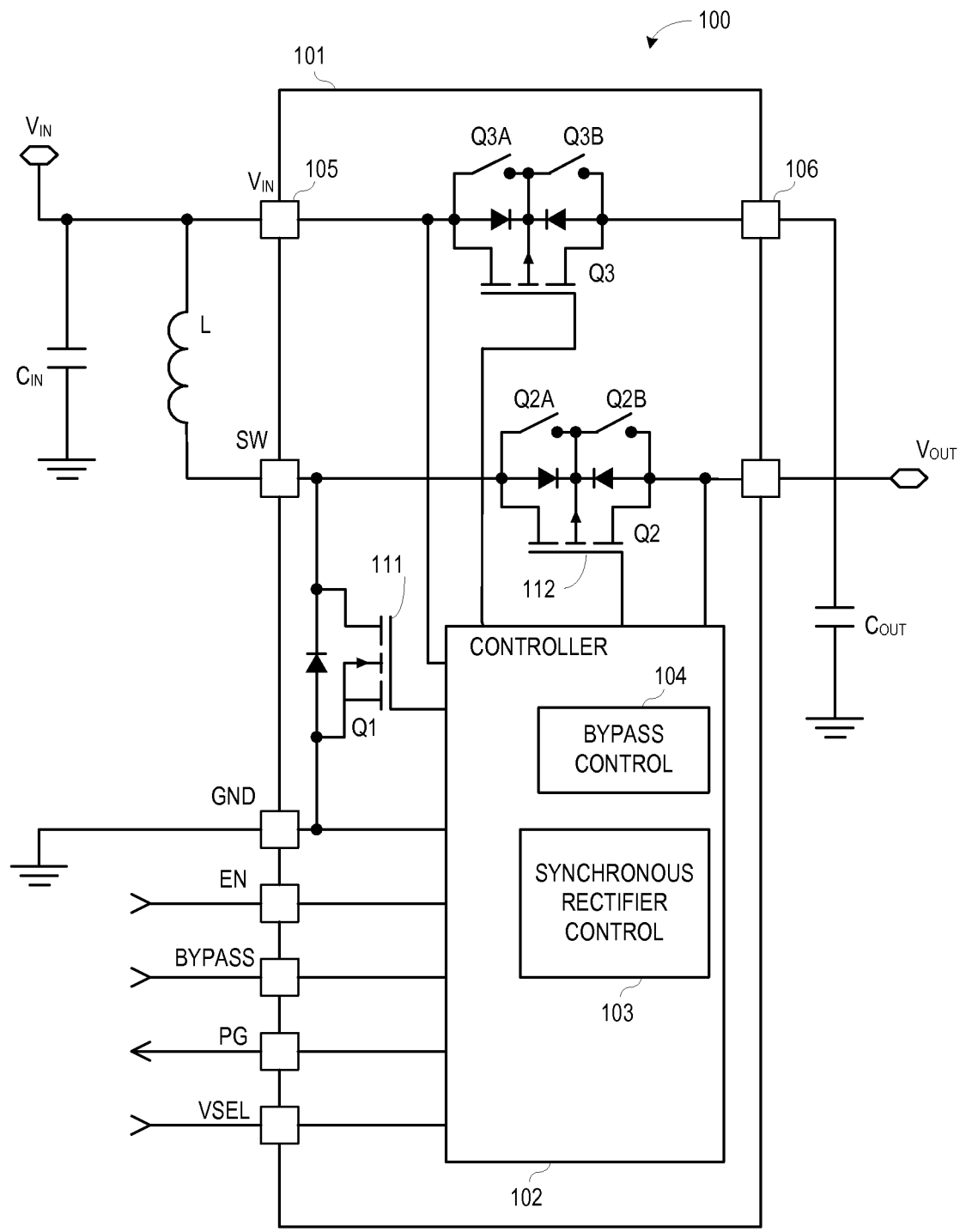
FIG. 1 illustrates generally an example computed on-time boost converter system.

Voltage converters such as buck, or boost converters, can receive a direct current (DC) input voltage and can provide at an output a DC output voltage that differs from the input voltage. In certain examples, the input voltage can be associated with a limited energy storage device such as a battery. In certain examples, the output voltage can be at near the input voltage during certain intervals of operation of the voltage converter. In certain examples, a boost converter, or regulator, can provide a minimum voltage rail for applications where it is likely the input voltage can fall below the desired voltage of the minimum voltage rail. Such applications can include, but are not limited to, battery operated devices such as mobile electronic devices.

In certain examples, the higher output voltage of a boost converter can be provided by storing energy in an inductor and releasing the stored energy to charge an output capacitor, or a capacitive load, to a desired output voltage level. Energy can be stored in an inductor by initiating or increasing current through the inductor. The stored energy of the inductor current can then be released to charge the output capacitor to a desired voltage level. In some applications, the boost regulator can provide a minimum voltage rail for applications that require higher voltages than a battery, for example, can supply.

When a load or a mode of a component receiving power from the boost regulator changes, the output voltage ($V_{OUT}$) of the boost regulator can deviate from a set point value (target $V_{OUT}$). For example, if the load current ramps up quickly (e.g., a "load step"), then the output voltage can be pulled down before it returns to the target $V_{OUT}$. This is referred to as undershoot. If the load current ramps down quickly, then the output voltage can rise above the target $V_{OUT}$ before it returns and settles at the target $V_{OUT}$. This is referred to as overshoot. These changes in load currents are referred to as load transients.

A line transient is the change in the input voltage ($V_{IN}$) of the boost regulator. Line transients can affect the output voltage of the boost regulator.

The present inventors have recognized, among other things, that line and load transients can be mitigated by shifting the set point or target output voltage level (target $V_{OUT}$) before the load step is applied. In certain examples, the set point can be adjusted in response to an input of the boost regulator to compensate for a load transient with known characteristics, such as when a mobile electronic device changes between modes where one mode (e.g., a high-power mode) consumes more energy than another mode (e.g., a low-power mode). In certain examples, such as mobile electronics, load transients with known characteristics can include, but are not limited to, enabling and disabling a transmitter, enabling transmissions or activating an illumination event. Transmissions can include, but are not limited to, wireless transmissions, such as global system for mobile communications (GSM) transmission pulses in a mobile phone, and infrared transmissions. Illumination events can include, but are not limited to, illuminating one or more light emitting diodes (LEDs) associated with a camera, illuminating one or more LEDs associated with a flashlight application, or changing an illumination level or brightness of a display of the device.

FIG. 1 illustrates generally an example computed on-time boost converter system 100 including a input capacitor ($C_{IN}$), an inductor (L), a boost converter 101 and an output capacitor ($C_{OUT}$). In certain examples, the boost converter 101, input capacitor ($C_{IN}$) and the inductor can be coupled to an input supply providing an DC input voltage ($V_{IN}$). In certain examples, the boost converter can provide an DC output voltage ($V_{OUT}$) to a load and the output capacitor ($C_{OUT}$). In certain examples, the boost converter can include a controller 102, a first transistor (Q1) 111, a second transistor (Q2) 112. In certain examples, the first transistor 111 of the boost converter 101 can be controlled into a low impedance mode to initiate or increase current through the inductor (L) by coupling a second terminal (SW) of the inductor (L) to ground (GND) during an on-time interval of a boost mode of the boost converter 101. In certain example, during an off-time of a boost mode of the boost converter 101, the second transistor 112 can couple the second terminal (SW) of the inductor (L) to an output of the boost converter 101, for example, to charge the load capacitor ($C_{OUT}$) to a desired output voltage level. In certain examples, a synchronous rectifier control module 103 associated with the controller can coordinate on and off times of the first and second transistors 111, 112 during the boost mode. In certain examples, the output voltage ($V_{OUT}$) of the boost converter 101 can be at least partially controlled by one or more pulse trains generated by the controller 102 and received by the first and second transistors 111, 112. In certain examples, a duty cycle can be associated with a pulse train. Duty cycle can refer to an ON:OFF ratio that indicates the ratio of the time duration of each pulse (an ON time) that is delivered versus the time duration between successive pulses (an OFF time). In certain examples, the boost mode of the boost converter can be used to ensure the output voltage ($V_{OUT}$) supplied by the boost converter maintains a minimum voltage level during times when the input voltage ($V_{OUT}$) is below the minimum voltage level. In some examples, when the input voltage ($V_{IN}$) is at or near the output voltage ($V_{OUT}$), the switching frequency of the boost controller can slow. In certain examples, when the input voltage is above a desired output voltage, the second transistor can operate at 100% duty cycle to couple the input voltage to the output of the converter through the inductor. This mode of operation is sometimes referred to as a bypass mode.

In certain examples, the boost converter can include a bypass transistor (Q3) 113. In some examples, the bypass transistor 113 can be controlled to a low impedance state when the input voltage is higher than a desired output voltage level. In certain examples, the bypass transistor bypass the inductor of the regulator system to provide a more direct coupling of the input voltage to the output of the regulator.

In certain examples, the boost converter 101 can include a voltage select (VSEL) input to select a desired output voltage. In some examples, the voltage select input (VSEL) can be a discrete input having a first state and a second state. When the voltage select input (VSEL) is in the first state the boost converter 101 can provide at least a first output voltage ($V_{OUT}$) at the output of the converter 101. When the voltage select input (VSEL) is in the second state the boost converter 101 can provide at least a second output voltage ($V_{OUT}$) at the output of the converter 101. In certain examples, the second output voltage can be higher than the first output voltage. In certain example systems, a boost converter 101 with a voltage select input (VSEL) can be used to mitigate disruptions to the output voltage ($V_{OUT}$) from transient events or conditions that can be anticipated. For example, a cellphone using a boost converter 101 with a voltage select input (VSEL) can modify the desired output voltage of the boost system prior to selecting a higher power mode of operation to mitigate disruptions of the output voltage ($V_{OUT}$) of the boost converter 101 caused by the higher power mode. Such high power modes can include higher loads such as wireless transmissions of the cell phone over a wireless network. In some applications, the effect of periodic input voltage transients on the output of a boost converter can be mitigated by adjusting the desired output voltage in advance of transients that can cause the output voltage to fall below a minimum voltage level.

Figure 2A:
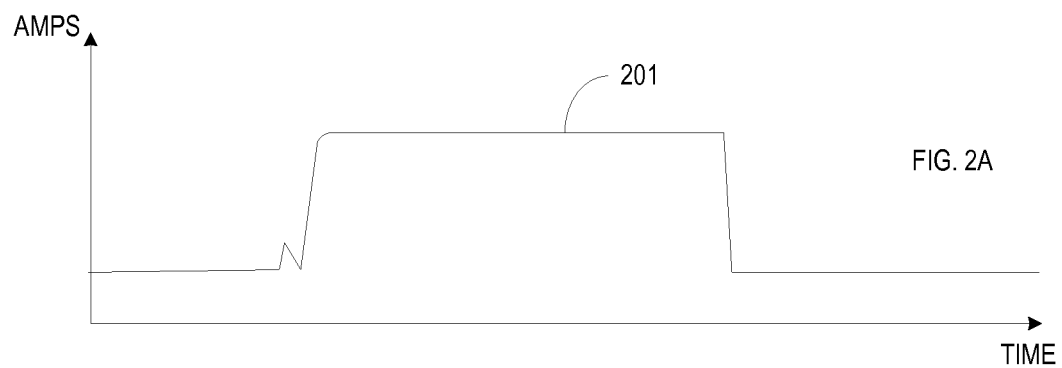
FIGS. 2A-2C illustrate waveforms associated with an example boost converter having a voltage select input.
Figure 2B:
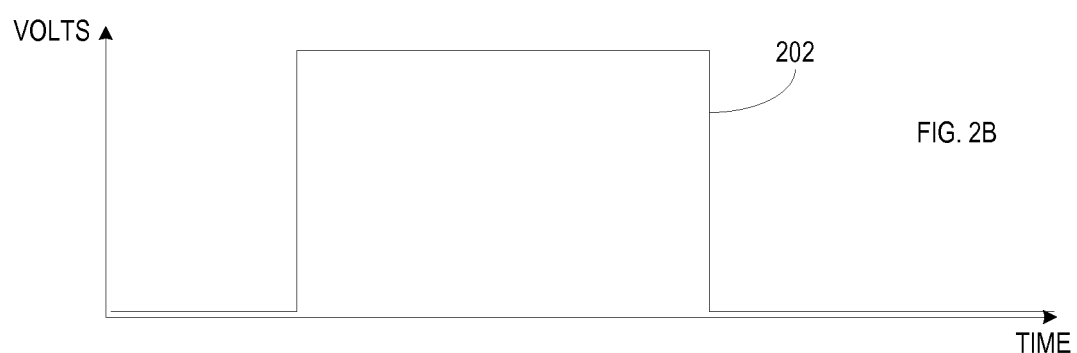
Figure 2C:
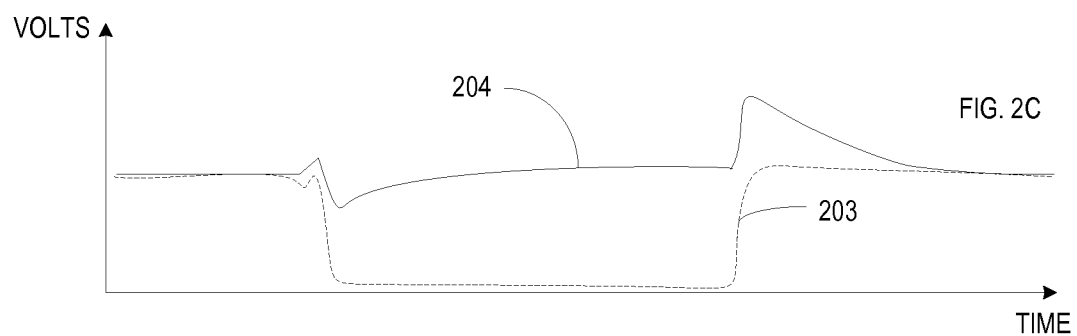

FIGS. 2A-2C illustrate waveforms associated with an example boost converter having a voltage select input. FIG. 2A illustrates an output current pulse 201 of the boost converter that is associated with a known load event, such as, but not limited to, a GSM transmission pulse in a mobile communication device. FIG. 2B illustrates a warning strobe signal 202 received at a voltage select input (VSEL) of the boost converter. The warning strobe signal 202 rises from a first state to a second state just before the load event begins, and then returns to the first state. FIG. 2C illustrates the input voltage 203 of the boost converter and the output voltage 204 of the boost converter. When the warning strobe signal 202 transitions from the first state to the second state, the boost converter changes a target output voltage from a first voltage to a higher second voltage. As the output voltage 204 begins to rise, the input voltage 203 can begin to dip a little. When the output current pulse 201 of load event starts to demand more current, the boost activity associated with raising the voltage from the first voltage to the second voltage minimizes the disruption to the output voltage 204 even as the current demand lowers the input voltage 203 considerably. Although the boost converter does not actually raise the output voltage 204 significantly above the first voltage level, the ability to adjust the target output voltage allowed the boost converter to provide sufficient power to a pre-determined load event while maintaining an adequate power rail voltage. In the illustrated example, the warning strobe signal 202 can transition from the second state to the first state before the end of the load event. In certain examples, the duration of the warning strobe signal 202 can be set to match the recovery time of the boost controller control loop. In actual measurements, the warning signal can assist in reducing the output voltage sag at the start of the load event by 50% over a boost controller without the ability to quickly adjust the target output voltage. In certain examples, the ability to quickly change the target output voltage of the boost converter can also reduce the size of the output capacitor of a given system compared to the size of an output capacitor required to provide the same performance without the use of a warning strobe.

Figure 3A:
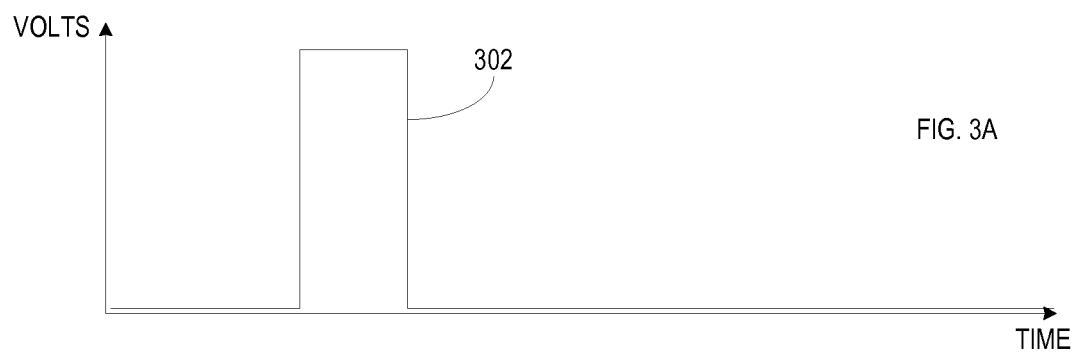
FIGS. 3A and 3B illustrate a situation in which reception of a warning strobe signal at a boost controller can assist in maintaining the output voltage of the boost controller at or near the target output value.
Figure 3B:
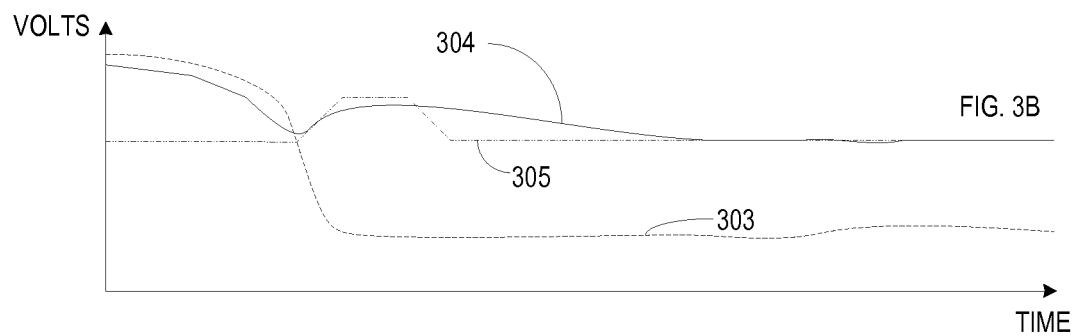

FIGS. 3A and 3B illustrate another situation in which reception of a warning strobe signal 302 at a boost controller can assist in maintaining the output voltage 304 of the boost controller at or near the target output value 305. The situation can occur when an input transient causes the input voltage 303 of the boost converter to fall relatively quickly. A controller coupled to the boost converter can detect the falling input voltage 303 and can provide a warning strobe signal 302 to the boost controller. Upon receiving the warning strobe signal 302, the boost converter can raise the target output voltage 305 of the converter to reduce the possibility that the output voltage 304 falls too low. In certain examples, upon receiving the warning strobe signal 302, the boost controller can exit a bypass mode and begin developing boost current in the inductor of the boost system. The boost activity of the boost controller can maintain the output voltage 304 near the original target output voltage 305 and can transition back to the original target output voltage 305 within a short amount of time.

Additional Notes

In Example 1, a method of increasing a set point of a boost converter configured to provide power to a mobile device can include receiving an indication that the mobile device will transition from a first, low-power mode to a second, higher-power modem, and increasing the set point of the boost converter in response to the indication.

In Example 2, the receiving the indication of Example 1 optionally includes receiving the indication before the mobile device transitions from the first mode to the second mode.

In Example 3, the receiving the indication of any one or more of Examples 1-2 optionally includes receiving an indication that the mobile device will transmit information over a wireless network using a wireless transmitter and power supplied by the boost converter.

In Example 4, the first low-power mode of any one or more of Examples 1-3 optionally includes a non-transmit mode and the second higher-power mode includes a transmit mode, wherein the mobile device is configured to transmit information in the transmit mode.

In Example 5, the receiving the indication of any one or more of Examples 1-4 optionally includes receiving an instruction to transmit information over a wireless network from the mobile device.

In Example 6, the second higher-power mode of any one or more of Examples 1-5 optionally includes an illumination mode.

In Example 7, the receiving the indication of any one or more of Examples 1-6 optionally includes receiving an instruction to illuminate a light emitting diode.

In Example 8, the receiving the indication of any one or more of Examples 1-7 optionally includes receiving an instruction to increase a display brightness.

In Example 9, an apparatus for converting power for a mobile device can include a boost converter configured to receive an indication that the mobile device will transition from a first low-power mode to a second high-power mode, and to increase the set point of the boost converter in response to the indication.

In Example 10, the boost converter of any one or more of Examples 1-9 optionally is configured to receive the indication before the mobile device transitions from the first mode to the second mode.

In Example 11, the boost converter of any one or more of Examples 1-10 optionally is configured to receive an indication that the mobile device will transmit information over a wireless network using a wireless transmitter and power supplied by the boost converter.

In Example 12, the first low-power mode of any one or more of Examples 1-11 optionally includes a non-transmit mode and the second higher-power mode includes a transmit mode, wherein the mobile device is configured to transmit the information in the transmit mode.

In Example 13, the second high-power mode of any one or more of Examples 1-12 optionally includes an illumination mode.

In Example 14, the indication of any one or more of Examples 1-13 optionally includes an instruction to illuminate a light emitting diode.

In Example 15, the indication of any one or more of Examples 1-14 optionally includes an instruction to increase a display brightness.

In Example 16, an electronic device can include a first component configured to operate in one of a first mode or a second mode, and to consume more energy when operating in the second mode compared to operating in the first mode, an energy storage device configured provide power to operate the electronic device, and a voltage converter configured to provide at least a portion of the power to the first component, to receive an input voltage from the energy storage device, to provide a first output voltage to the first component during the second mode, and to provide a second output voltage to the first component responsive to a warning strobe received at an input of the voltage converter.

In Example 17, the electronic device of any one or more of Examples 1-3 optionally includes a controller configured to schedule and control selection of the first mode and the second mode of the first component and to provide the warning strobe prior to selecting the second mode of the first component.

In Example 18, the first component of any one or more of Examples 1-17 optionally includes an illumination device, and wherein the first mode is configured to provide a first illumination power from the illumination device and the second mode is configured to provide a second illumination power from the illumination device wherein the second illumination power is greater than the first illumination power.

In Example 19, the illumination device of any one or more of Examples 1-18 optionally includes a light-emitting diode (LED).

In Example 20, the illumination device of any one or more of Examples 1-19 optionally is associated with a display screen.

In Example 21, the first component of any one or more of Examples 1-20 optionally includes a transmitter, wherein during the first mode the transmitter is disabled, and wherein during the second mode the transmitter is enabled to transmit.

In Example 22, the transmitter of any one or more of Examples 1-21 optionally includes a wireless transmitter.

Example 23 can include, or can optionally be combined with any portion or combination of any portions of any one or more of Examples 1 through 22 to include, subject matter that can include means for performing any one or more of the functions of Examples 1 through 22, or a machine-readable medium including instructions that, when performed by a machine, cause the machine to perform any one or more of the functions of Examples 1 through 22.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method comprising:
providing a constant, non-zero DC voltage on a power rail of the mobile device using boost converter and a set point voltage set at a first set point;
receiving an indication that the mobile device will transition from a first, low-power mode to a second, higher-power mode;
increasing the set point voltage of the boost converter to a second set point in response to the indication; and
decreasing the set point voltage during the second mode to the first set point when the voltage of the power rail is at or above the first set point during the second, higher-power mode.

2. The method of claim 1, wherein the receiving the indication includes receiving the indication before the mobile device transitions from the first mode to the second mode.

3. The method of claim 2, wherein the receiving the indication includes receiving an indication that the mobile device will transmit information over a wireless network using a wireless transmitter and power supplied by the boost converter.

4. The method of claim 2, wherein the first low-power mode includes a non-transmit mode and the second higher-power mode includes a transmit mode, wherein the mobile device is configured to transmit information in the transmit mode.

5. The method of claim 2, wherein the receiving the indication includes receiving an instruction to transmit information over a wireless network from the mobile device.

6. The method of claim 2, wherein the second higher-power mode includes an illumination mode.

7. The method of claim 6, wherein the receiving the indication includes receiving an instruction to illuminate a light emitting diode.

8. The method of claim 6, wherein the receiving the indication includes receiving an instruction to increase a display brightness.

9. An apparatus for converting power for a mobile device, the apparatus comprising:
a boost converter configured to receive an indication that the mobile device will transition from a first low-power mode to a second high-power mode, to increase a set point voltage of the boost converter from a first value to a second value in response to the indication, and to decrease the set point voltage to the first value when an output voltage of the boost converter increases to a level associated with the first value of the set point during the second high-power mode.

10. The apparatus of claim 9, wherein the boost converter is configured to receive the indication before the mobile device transitions from the first mode to the second mode.

11. The apparatus of claim 10, wherein the boost converter is configured to receive an indication that the mobile device will transmit information over a wireless network using a wireless transmitter and power supplied by the boost converter.

12. The apparatus of claim 11, wherein the first low-power mode includes a non-transmit mode and the second higher-power mode includes a transmit mode, wherein the mobile device is configured to transmit the information in the transmit mode.

13. The apparatus of claim 10, wherein the second high-power mode includes an illumination mode.

14. The apparatus of claim 13, wherein the indication includes an instruction to illuminate a light emitting diode.

15. The apparatus of claim 13, wherein the indication includes an instruction to increase a display brightness.

16. An electronic device comprising:
a first component configured to operate in one of a first mode or a second mode, and to consume more energy when operating in the second mode compared to operating in the first mode;
an energy storage device configured provide power to operate the electronic device; and
a voltage converter configured to provide at least a portion of the power to the first component, to receive an input voltage from the energy storage device, to provide a first output voltage associated with a first set point to the first component during the second mode, to receive a second set point that is higher than the first set point, to attempt to provide a second output voltage associated with the second set point to the first component responsive to a warning strobe received at an input of the voltage converter, and to provide the first output voltage associated with a first set point when the voltage converter provides the first output voltage in response to the attempt to provide the second output voltage during the second mode.

17. The electronic device of claim 16, including a controller configured to schedule and control selection of the first mode and the second mode of the first component and to provide the warning strobe prior to selecting the second mode of the first component.

18. The electronic device of claim 17, wherein the first component includes an illumination device; and
wherein the first mode is configured to provide a first illumination power from the illumination device and the second mode is configured to provide a second illumination power from the illumination device wherein the second illumination power is greater than the first illumination power.

19. The electronic device of claim 18, wherein the illumination device includes a light-emitting diode (LED).

20. The electronic device of claim 18, wherein the illumination device is associated with a display screen.

21. The electronic device of claim 17, wherein the first component includes a transmitter;
wherein during the first mode the transmitter is disabled; and
wherein during the second mode the transmitter is enabled to transmit.

22. The electronic device of claim 21, wherein the transmitter includes a wireless transmitter.

* * * * *